(12) United States Patent
Berardi et al.

(10) Patent No.: US 6,462,152 B1
(45) Date of Patent: Oct. 8, 2002

(54) POLYMERIZATION PROCESS

(75) Inventors: Alain Berardi, Marseille; John Gabriel Speakman, Martigues, both of (FR)

(73) Assignee: BP Chemicals Limited, London (GB)

( * ) Notice: Subject to any disclaimer, the term of this patent is extended or adjusted under 35 U.S.C. 154(b) by 0 days.

(21) Appl. No.: 09/698,258

(22) Filed: Oct. 30, 2000

Related U.S. Application Data

(63) Continuation of application No. PCT/GB99/03815, filed on Nov. 16, 1999.

(30) Foreign Application Priority Data

Nov. 30, 1998 (EP) .............................. 98430025

(51) Int. Cl.$^7$ ............................... C08F 2/01; C08F 4/44
(52) U.S. Cl. ............................. 526/75; 526/64; 526/65; 526/161; 526/171; 526/172; 526/901; 502/155; 502/167
(58) Field of Search ............................... 526/171, 172, 526/161, 75, 901, 64, 65; 502/104, 117, 152, 155, 168, 167

(56) References Cited

U.S. PATENT DOCUMENTS

| | | | | |
|---|---|---|---|---|
| 5,955,555 A | * | 9/1999 | Bennett | 526/120 |
| 6,063,881 A | * | 5/2000 | Bennett | 526/161 |
| 6,103,946 A | * | 8/2000 | Brookhart et al. | 585/521 |
| 6,150,482 A | * | 11/2000 | Brookhart et al. | 526/130 |
| 6,184,171 B1 | * | 2/2001 | Shih | 502/158 |
| 6,214,761 B1 | * | 4/2001 | Bennett | 502/117 |
| 6,252,022 B1 | * | 6/2001 | Arthur et al. | 502/155 |

FOREIGN PATENT DOCUMENTS

| | | |
|---|---|---|
| WO | WO 98/27124 | 6/1998 |
| WO | WO 99/46304 | 9/1999 |

OTHER PUBLICATIONS

K. Sugimura et al., "Olefin Polymerization Catalysts and (Co)Polymerization of Olefins Therewith", Chemical Abstracts, vol. 127, No. 26, Abstract No. 359237, of JP9272713, (1997).

K. Sugimura et al., "Catalysts and Polymerization of Olefins Using the Same", Chemical Abstracts, vol. 128, No. 2, Abstract No. 13523, of JP9278822, (1998).

* cited by examiner

*Primary Examiner*—David W. Wu
*Assistant Examiner*—R. Harlan
(74) *Attorney, Agent, or Firm*—Finnegan, Henderson, Farabow, Garrett and Dunner, L.L.P.

(57) ABSTRACT

A process for the polymerization of 1-olefins which comprises the steps of a) preparing a prepolymer-based catalyst by contacting one or more 1-olefins with a catalyst system, and b) contacting the prepolymer-based catalyst with one or more 1-olefins, wherein the catalyst system comprises (1) a compound of formula (I) wherein M is Fe[II], Fe[III], Co[I], Co[II], Co[III], Mn[I], Mn[II], Mn[III], Mn[IV], Ru[II], RU[III] or Ru[IV]; X represents an atom or group covalently or ionically bonded to the transition metal M; T is the oxidation state of the transition metal M and b is the valency of the atom or group X; $R^1$, $R^2$, $R^3$, $R^4$, $R^5$, $R^6$ and $R^7$ are independently selected from hydrogen, halogen, hydrocarbyl, substituted hydrocarbyl, heterohydrocarbyl or substituted heterohydrocarbyl; and when any two or more of $R^1$–$R^7$ are hydrocarbyl, substituted hydrocarbyl, heterohydrocarbyl or substituted heterohydrocarbyl, said two or more can be linked to form one or more cyclic substituents; optionally (2) an activator, and also optionally (3) a compound of the formula $AlR_3$, wherein each R is independently $C_1$–$C_{12}$ alkyl or halo.

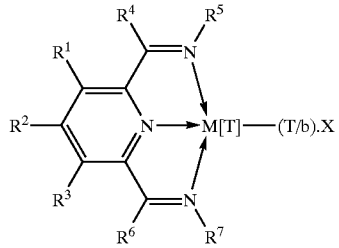

Formula I

21 Claims, No Drawings

POLYMERIZATION PROCESS

This application is a Continuation of International Application Number PCT/GB99/03815, filed Nov. 16, 1999.

The present invention relates to a process for the polymerisation of 1-olefins.

The use of certain transition metal compounds to polymerise 1-olefins, for example, ethylene, is well established in the prior art. They include chromium-based catalysts, Ziegler-Natta catalysts and metallocene catalysts. WO98/27124 has recently disclosed that ethylene may be polymerised by contacting it with certain iron or cobalt complexes of selected 2,6-pyridinecarboxaldehydebis(imines) and 2,6-diacylpyridinebis(imines). These complexes are disclosed as being suitable for preparing homopolymers of ethylene.

Processes for the polymerisation of 1-olefins can be operated by polymerising the monomers in the gas phase, or in solution or in suspension in a liquid hydrocarbon diluent. In the so-called "solution process" the (co)polymerisation is conducted by introducing the monomer into a solution or suspension of the catalyst in a liquid hydrocarbon diluent under conditions of temperature and pressure such that the produced polyolefin forms as a solution in the hydrocarbon diluent. In the "slurry process" the temperature, pressure and choice of diluent are such that the produced polymer forms as a suspension in the liquid hydrocarbon diluent. These processes are generally operated at relatively low pressures (for example 10–50 bar) and low temperature (for example 50 to 150° C.). Polymerisation of the monomers can alternatively be carried out in the gas phase (the "gas phase process"), for example by fluidising under polymerisation conditions a bed comprising the target polyolefin powder and particles of the desired catalyst using a fluidising gas stream comprising the gaseous monomer.

It is known that, prior to its utilisation for polymerisation, the catalyst system may be converted into a prepolymer by an operation known as "prepolymerisation", where the catalyst system is brought into contact with a 1-olefin. We have discovered that when the catalyst is a type such as those disclosed in WO 98/27124 above, prepolymerisation affords a number of process advantages.

Accordingly in a first aspect the present invention provides a process for the polymerisation of 1-olefins comprising the steps of:

a) preparing a prepolymer-based catalyst by contacting one or more 1-olefins with a catalyst system, and b) contacting the prepolymer-based catalyst with one or more 1-olefins, wherein the catalyst system comprises (1) a compound of the formula I Formula I

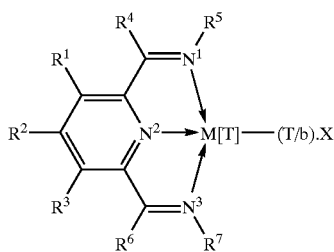

wherein M is Fe[II], Fe[III], Co[I], Co[II], Co[III], Mn[I], Mn[II], Mn[III], Mn[IV], Ru[II], Ru[III] or Ru[IV]; X represents an atom or group covalently or ionically bonded to the transition metal M; T is the oxidation state of the transition metal M and b is the valency of the atom or group X; $R^1$, $R^2$, $R^3$, $R^4$, $R^5$, $R^6$ and $R^7$ are independently selected from hydrogen, halogen, hydrocarbyl, substituted hydrocarbyl, heterohydrocarbyl or substituted heterohydrocarbyl; and when any two or more of $R^1$–$R^7$ are hydrocarbyl, substituted hydrocarbyl, heterohydrocarbyl or substituted heterohydrocarbyl, said two or more can be linked to form one or more cyclic substituents; optionally in the presence of (2) an activator.

We have found that performing a prepolymerisation step as defined above results in reduced activity in the main polymerisation, avoiding "hot spots" in the reactor. Other changes such as a reduction in the melt index potential are also observed.

Preferably in Formula I above M is Fe[II], Fe[III], Co[II] or Co[III]; X represents an atom or group covalently or ionically bonded to the transition metal M; T is the oxidation state of the transition metal M and b is the valency of the atom or group X; $R^1$, $R^2$, $R^3$, $R^4$, $R^5$, $R^6$ and $R^7$ are independently selected from hydrogen, halogen, hydrocarbyl, substituted hydrocarbyl, heterohydrocarbyl or substituted heterohydrocarbyl; and when any two or more of $R^1$–$R^7$ are hydrocarbyl, substituted hydrocarbyl, heterohydrocarbyl or substituted heterohydrocarbyl, said two or more can be linked to form one or more cyclic substituents.

As activator (2), the catalyst system may additionally include an alkylalumoxane which is normally a ($C_1$–$C_4$) alkylalumoxane, the alkyl group generally being methyl, ethyl, propyl or isobutyl. Preferred is methylalumoxane (also known as methylaluminoxane or MAO) or modified methylalumoxane (MMAO). The alkylalumoxane, may be added either at the prepolymerisation stage (a) or before or during the main polymerisation stage (b).

Optionally the catalyst system may also comprise (3) a compound of the formula $AlR_3$, where each R is independently $C_1$–$C_{12}$ alkyl or halo, compound (3) being added either prior to prepolymerisation step (a) or before or during the main polymerisation step (b). The three substituents R in compound (3), which may be the same or different, are preferably hydrogen, methyl, ethyl, butyl or chloro. Preferred compounds (3) include trimethylaluminium (TMA), triethylaluminium (TEA), tri-isobutylaluminium (TIBA), tri-n-octylaluminium, ethylaluminium dichloride and diethylaluminium chloride. Most preferred are TMA and TIBA. However the preferred compound (3) may depend on the polymerisation conditions in which the catalyst is employed: for example, TMA is particularly effective at improving catalyst activity in gas phase and also the activity of unsupported catalysts in slurry phase, whilst TIBA is particularly effective in slurry phase polymerisation generally.

Regarding activator (2), the term "alkylalumoxane" as used in this specification includes alkylalumoxanes available commercially which may contain a proportion, typically about 10 wt %, but optionally up to 50 wt %, of the corresponding trialkylaluminium; for instance, commercial MAO usually contains approximately 10% trimethylaluminium (TMA), whilst commercial MMAO contains both TMA and TIBA. Quantities of alkylalumoxane quoted herein include such trialkylalkylaluminium impurities, and accordingly component (3) in this invention is considered to comprise compounds of the formula $AlR_3$ additional to any $AlR_3$ compound incorporated within the alkylalumoxane (2), and quantities of component (3) quoted herein are calculated on that basis.

In the preparation of the catalyst systems of the present invention the quantity of activating compound (2) to be employed is easily determined by simple testing, for example, by the preparation of small test samples which can be used to polymerise small quantities of the monomer(s) and thus to determine the activity of the produced catalyst. It is generally found that the quantity employed is sufficient to provide 0.1 to 20,000 atoms, preferably 1 to 2000 atoms of aluminium per Fe, Co, Mn or Ru metal atom in the compound of Formula I. The amount of activator (2) required for optimum performance may also depend on the amount of alkylaluminium compound (3) present. For example, when compound (3) is trimethyl aluminium (TMA), and the amount of TMA in the catalyst is less than 500 molar equivalents relative to the metal atom of compound (1), the amount of alkylalumoxane (usually MAO) is preferably at least 1000 molar equivalents. However if more than 500 equivalents of TMA are present, the optimum amount of alkylalumoxane (usually MAO) is from 500 to 1000 equivalents.

Further compounds for use in the present invention include those comprising the skeletal unit depicted in Formula II:

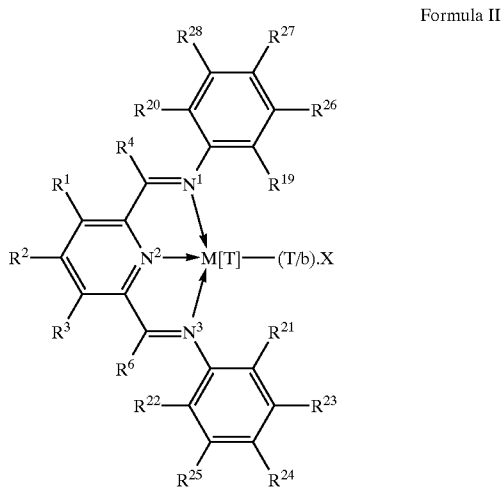

Formula II wherein M is Fe[II], Fe[III], Co[I], Co[II], Co[III], Mn[I], Mn[II], Mn[III], Mn[IV], Ru[II], Ru[III] or Ru[IV]; X represents an atom or group covalently or ionically bonded to the transition metal M; T is the oxidation state of the transition metal M and b is the valency of the atom or group X; $R^1$ to $R^4$, $R^6$ and $R^{19}$ to $R^{28}$ are independently selected from hydrogen, halogen, hydrocarbyl, substituted hydrocarbyl, heterohydrocarbyl or substituted heterohydrocarbyl; when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more can be linked to form one or more cyclic substituents; with the proviso that at least one of $R^{19}$, $R^{20}$, $R^{21}$ and $R^{22}$ is hydrocarbyl, substituted hydrocarbyl, heterohydrocarbyl or substituted heterohydrocarbyl when neither of the two outer ring systems forms part of a polyaromatic fused-ring system. In this particular aspect of the present invention, in the case that neither of the two outer ring systems forms part of a polyaromatic ring system, it is preferred that at least one of $R^{19}$ and $R^{20}$, and at least one of $R^{21}$ and $R^{22}$ is selected from hydrocarbyl, substituted hydrocarbyl, heterohydrocarbyl or substituted heterohydrocarbyl, and most preferably each of $R^{19}$, $R^{20}$, $R^{21}$ and $R^{22}$ is selected from hydrocarbyl, substituted hydrocarbyl, heterohydrocarbyl or substituted heterohydrocarbyl.

Subject to the foregoing provisos regarding $R^{19}$, $R^{20}$, $R^{21}$ and $R^{22}$ in Formula II, $R^1$ to $R^4$ and $R^6$ in the compounds depicted in Formulae I and II, and $R^{19}$ to $R^{28}$ in the compounds depicted in Formula II of the present invention are preferably independently selected from hydrogen and $C_1$ to $C_8$ hydrocarbyl, for example, methyl, ethyl, n-propyl, n-butyl, n-hexyl, and n-octyl. In Formula I, $R^5$ and $R^7$ are preferably independently selected from substituted or unsubstituted alicyclic, heterocyclic or aromatic groups, for example, phenyl, 1-naphthyl; 2-naphthyl, 2-methylphenyl, 2-ethylphenyl, 2,6-disopropylphenyl, 2,3-diisopropylphenyl, 2,4-diisopropylphenyl, 2,6-di-n-butylphenyl, 2,6-dimethylphenyl, 2,3-dimethylphenyl, 2,4-dimethylphenyl, 2-t-butylphenyl, 2,6-diphenylphenyl, 2,4,6-trimethylphenyl, 2,6-trifluoromethylphenyl, 4-bromo-2,6-dimethylphenyl, 3,5 dichloro2,6-diethylphenyl, and 2,6,bis (2,6-dimethylphenyl)phenyl, cyclohexyl and pyridinyl.

The two outer ring systems in Formula II are preferably independently 2,6-hydrocarbylphenyl or fused-ring polyaromatic, for example, I-naphthyl, 2-naphthyl, 1-phenanthrenyl and 8quinolinyl.

In the compounds of Formula I or II of the present invention, M is preferably Fe[II], Mn[II] or Co[II].

Examples of the atom or group X in the compounds of Formula I and II are halide, for example, chloride, bromide; hydride; hydrocarbyloxide, for example, methoxide, ethoxide, isopropoxide, phenoxide; carboxylate, for example, formate, acetate, benzoate; hydrocarbyl, for example, methyl, ethyl, propyl, butyl, octyl, decyl, phenyl, benzyl; substituted hydrocarbyl; heterohydrocarbyl; tosylate; and triflate. Preferably X is selected from halide, hydride and hydrocarbyl. Chloride is particularly preferred.

The following are examples of nitrogen-containing transition metal complexes that can be employed in the catalyst of the present invention:
2,6-diacetylpyridinebis(2,6-diisopropylanil)FeCl$_2$
2,6-diacetylpyridinebis(2,6-diisopropylanil)MnCl$_2$
2,6-diacetylpyridinebis(2,6-diisopropylanil)CoCl$_2$
2,6-diacetylpyridinebis(2-tert.-butylanil)FeCl$_2$
2,6-diacetylpyridinebis(2,3-dimethylanil)FeCl$_2$
2,6-diacetylpyridinebis(2-methylanil)FeCl$_2$
2,6-diacetylpyridinebis(2,4-dimethylanil)FeCl$_2$
2,6-diacetylpyridinebis(2,6-dimethylanil)FeCl$_2$
2,6-diacetylpyridinebis(2,6-dimethyl 4t-butylanil)FeCl$_2$
2,6-diacetylpyridinebis(2,4,6 trimethylanil)FeCl$_2$
2,6-dialdiminepyridinebis(2,6-dimethylanil)FeCl$_2$
2,6-dialdiminepyridinebis(2,6-diethylanil)FeCl$_2$
2,6-dialdiminepyridinebis(2,6-diisopropylanil)FeCl$_2$
2,6-dialdiminepyridinebis(1-naphthil)FeCl$_2$ and
2,6-bis(1,1-diphenylhydrazone)pyridine.FeCl$_2$.

A preferred complex of the present invention is 2,6-diacetylpyridinebis(2,4,6 trimethylanil)FeCl$_2$.

The catalyst system may optionally additionally comprise (4) a neutral Lewis base, which may be added either at the prepolymerisation stage (a) or before or during the main polymerisation (b). Neutral Lewis bases are well known in the art of Ziegler-Natta catalyst polymerisation technology. Examples of classes of neutral Lewis bases suitably employed in the present invention are unsaturated hydrocarbons, for example, alkenes (other than 1-olefins) or alkynes, primary, secondary and tertiary amines, amides, phosphoramides, phosphines, phosphites, ethers, thioethers, nitriles, carbonyl compounds, for example, esters, ketones, aldehydes, carbon monoxide and carbon dioxide, sulphoxides, sulphones and boroxines. Although 1-olefins are capable of acting as neutral Lewis bases, for the purposes of the present invention they are regarded as monomer or comonomer 1-olefins and not as neutral Lewis bases per se. However, alkenes which are internal olefins, for example, 2-butene and cyclohexene are regarded as neutral Lewis bases in the present invention. Preferred Lewis bases are tertiary amines and aromatic esters, for example, dimethylaniline, diethylaniline, tributylamine, ethylbenzoate and benzylbenzoate. In this particular aspect of the present invention, components (1), (2) and (4) of the catalyst system can be brought together simultaneously or in any desired order. However, if components (2) and (4) are compounds which interact together strongly, for example, form a stable compound together, it is preferred to bring together either components (1) and (2) or components (1) and (4) in an initial step before introducing the final defined component. Preferably components (1) and (4) are contacted together before component (2) is introduced. The quantities of components (1) and (2) employed in the preparation of this catalyst system are suitably as described above in relation to the catalysts of the present invention. The quantity of the neutral Lewis Base [component (4)] is preferably such as to provide a ratio of component (1):component (4) in the range 100:1 to 1:1000, most preferably in the range 1:1 to 1:20. Components (1), (2) and (4) of the catalyst system can brought together, for example, as the neat materials, as a suspension or solution of the materials in a suitable diluent or solvent (for example a liquid hydrocarbon), or, if at least one of the components is volatile, by utilising the vapour of that component. The components can be brought together at any desired temperature. Mixing the components together at room temperature is generally satisfactory. Heating to higher temperatures e.g. up to 120° C. can be carried out if desired, e.g. to achieve better mixing of the components. It is preferred to carry out the bringing together of components (1), (2) and (4) in an inert atmosphere (eg dry nitrogen) or in vacuo. If it is desired to use the catalyst on a support material (see below), this can be achieved, for example, by preforming the catalyst system comprising components (1), (2) and (4) and impregnating the support material preferably with a solution thereof, or by introducing to the support material one or more of the components simultaneously or sequentially. If desired the support material itself can have the properties of a neutral Lewis base and can be employed as, or in place of, component (4). An example of a support material having neutral Lewis base properties is poly(aminostyrene) or a copolymer of styrene and aminostyrene (ie vinylaniline).

The compounds employed as catalysts in the catalyst systems of the present invention can if desired comprise more than one of the above-defined transition metal compounds. The catalyst may comprise, for example a mixture of 2,6-diacetylpyridinebis(2,6-diisopropylanil)FeCl$_2$ complex and 2,6-diacetylpyridinebis(2,4,6-trimethylanil)FeCl$_2$ complex, or a mixture of 2,6-diacetylpyridinebis(2,6-diisopropylanil)CoCl$_2$ and 2,6-diacetylpyridinebis(2,4,6-trimethylanil)FeCl$_2$. In addition to said one or more defined transition metal compounds, the catalysts can also include one or more other types of transition metal compounds or catalysts, for example, transition metal compounds of the type used in conventional Ziegler-Natta catalyst systems, metaflocene-based catalysts, or heat activated supported chromium oxide catalysts (e.g. Phillips-type catalyst).

The catalysts employed in the present invention can be unsupported or supported on a support material, for example, silica, alumina, or zirconia, or on a polymer or prepolymer, for example polyethylene, polystyrene, or poly (aminostyrene). If desired the catalysts can be formed in situ in the presence of the support material, or the support material can be pre-impregnated or premixed, simultaneously or sequentially, with one or more of the catalyst components. The catalysts can if desired be supported on a heterogeneous catalyst, for example, a magnesium halide supported Ziegler Natta catalyst, a Phillips type (chromium oxide) supported catalyst or a supported metallocene catalyst. Formation of the supported catalyst can be achieved for example by treating the transition metal compounds with alumoxane in a suitable inert diluent, for example a volatile hydrocarbon, slurrying a particulate support material with the product and evaporating the volatile diluent. The quantity of support material employed can vary widely, for example from 100,000 to 1 grams per gram of metal present in the transition metal compound.

In a preferred process the catalyst system is activated with the methylalumoxane (2) before contact with the monomer to form the prepolymer.

The prepolymer can be prepared in the gas phase, but is preferably prepared in the slurry phase in a stirred reactor. General conditions for these types of polymerisation are described below in connection with the main polymerisation. The prepolymerisation step preferably comprises contacting the catalyst system with ethylene, propylene, or ethylene or propylene mixed with at least one higher olefin so that the prepolymer contains from $2 \times 10^{-4}$ to $5 \times 10^{-1}$ milligram atom of transition metal per gram of polymer (a milligram atom of iron for example is 56 mg). The active particles of prepolymer thus obtained are then introduced into the main polymerisation reactor.

The conditions of the main polymerisation stage can be, for example, solution phase, slurry phase, gas phase or bulk phase, with polymerisation temperatures ranging from $-100°$ C. to $+300°$ C., and at pressures of atmospheric and above, particularly from 140 to 4100 kPa. If desired, the catalyst can be used to polymerise ethylene under high pressure/high temperature process conditions wherein the polymeric material forms as a melt in supercritical ethylene. Preferably the polymerization is conducted under gas phase fluidised bed or stirred bed conditions.

Suitable monomers for use in the polymerisation process of the present invention are, for example, ethylene and $C_{2-20}$ α-olefins, specifically propylene, 1-butene, 1-pentene, 1-hexene, 4-methylpentene-1, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene. Other monomers include methyl methacrylate, methyl acrylate, butyl acrylate, acrylonitrile, vinyl acetate, and styrene. Preferred monomers for homopolymerisation processes are ethylene and propylene.

The catalysts and process of the invention can also be used for copolymerising ethylene or propylene with each other or with other 1-olefins such as 1-butene, 1-hexene, 4-methylpentene-1, and octene, or with other monomeric materials, for example, methyl methacrylate, methyl acrylate, butyl acrylate, acrylonitrile, vinyl acetate, and styrene.

Irrespective of the polymerisation or copolymerisation technique employed, polymerisation or copolymerisation is typically carried out under conditions that substantially exclude oxygen, water, and other materials that act as catalyst poisons. Also, polymerisation or copolymerisation can be carried out in the presence of additives to control polymer or copolymer molecular weights.

The use of hydrogen gas as a means of controlling the average molecular weight of the polymer or copolymer applies generally to the polymerisation process of the present invention. For example, hydrogen can be used to reduce the average molecular weight of polymers or copolymers prepared using gas phase, slurry phase, bulk phase or solution phase polymerisation conditions. The quantity of hydrogen gas to be employed to give the desired average molecular weight can be determined by simple "trial and error" polymerisation tests.

The polymerisation process of the present invention provides polymers and copolymers, especially ethylene polymers, at remarkably high productivity (based on the amount of polymer or copolymer produced per unit weight of complex employed in the catalyst system). This means that relatively very small quantities of transition metal complex are consumed in commercial processes using the process of the present invention. It also means that when the polymerisation process of the present invention is operated under polymer recovery conditions that do not employ a catalyst separation step, thus leaving the catalyst, or residues thereof, in the polymer (e.g. as occurs in most commercial slurry and gas phase polymerisation processes), the amount of transition metal complex in the produced polymer can be very small.

Slurry phase polymerisation conditions or gas phase polymerisation conditions are particularly useful for the production of high or low density grades of polyethylene, and polypropylene. In these processes the polymerisation conditions can be batch, continuous or semi-continuous. Furthermore, one or more reactors may be used, e.g. from two to five reactors in series. Different reaction conditions, such as different temperatures or hydrogen concentrations may be employed in the different reactors. In the slurry phase process and the gas phase process, the catalyst is generally metered and transferred into the polymerisation zone in the form of a particulate solid either as a dry powder (e.g. with an inert gas) or as a slurry. This solid can be, for example, a solid catalyst system formed from the one or more of complexes of the invention and an activator with or without other types of catalysts, or can be the solid catalyst alone with or without other types of catalysts. In the latter situation, the activator can be fed to the polymerisation zone, for example as a solution, separately from or together with the solid catalyst. Preferably the catalyst system or the transition metal complex component of the catalyst system employed in the slurry polymerisation and gas phase polymerisation is supported on one or more support materials. Most preferably the catalyst system is supported on the support material prior to its introduction into the polymerisation zone. Suitable support materials are, for example, silica, alumina, zirconia, talc, kieselguhr, or magnesia. Impregnation of the support material can be carried out by conventional techniques, for example, by forming a solution or suspension of the catalyst components in a suitable diluent or solvent, and slurrying the support material therewith. The support material thus impregnated with catalyst can then be separated from the diluent for example, by filtration or evaporation techniques. Once the polymer product is discharged from the reactor, any associated and absorbed hydrocarbons are substantially removed, or degassed, from the polymer by, for example, pressure let-down or gas purging using fresh or recycled steam, nitrogen or light hydrocarbons (such as ethylene). Recovered gaseous or liquid hydrocarbons may be recycled to the polymerisation zone.

In the slurry phase polymerisation process the solid particles of catalyst, or supported catalyst, are fed to a polymerisation zone either as dry powder or as a slurry in the polymerisation diluent. The polymerisation diluent is compatible with the polymer(s) and catalyst(s), and may be an alkane such as hexane, heptane, isobutane, or a mixture of hydrocarbons or paraffins. Preferably the particles are fed to a polymerisation zone as a suspension in the polymerisation diluent. The polymerisation zone can be, for example, an autoclave or similar reaction vessel, or a continuous loop reactor, e.g. of the type well-know in the manufacture of polyethylene by the Phillips Process. When the polymerisation process of the present invention is carried out under slurry conditions the polymerisation is preferably carried out at a temperature above 0° C., most preferably above 15° C. The polymerisation temperature is preferably maintained below the temperature at which the polymer commences to soften or sinter in the presence of the polymerisation diluent. If the temperature is allowed to go above the latter temperature, fouling of the reactor can occur. Adjustment of the polymerisation within these defined temperature ranges can provide a useful means of controlling the average molecular weight of the produced polymer. A further useful means of controlling the molecular weight is to conduct the polymerisation in the presence of hydrogen gas which acts as chain transfer agent. Generally, the higher the concentration of hydrogen employed, the lower the average molecular weight of the produced polymer.

In bulk polymerisation processes, liquid monomer such as propylene is used as the polymerisation medium.

Methods for operating gas phase polymerisation processes are well known in the art. Such methods generally involve agitating (e.g. by stirring, vibrating or fluidising) a bed of catalyst, or a bed of the target polymer (i.e. polymer having the same or similar physical properties to that which it is desired to make in the polymerisation process) containing a catalyst, and feeding thereto a stream of monomer at least partially in the gaseous phase, under conditions such that at least part of the monomer polymerises in contact with the catalyst in the bed. The bed is generally cooled by the addition of cool gas (e.g. recycled gaseous monomer) and/or volatile liquid (e.g. a volatile inert hydrocarbon, or gaseous monomer which has been condensed to form a liquid). The polymer produced in, and isolated from, gas phase processes forms directly a solid in the polymerisation zone and is free from, or substantially free from liquid. As is well known to those skilled in the art, if any liquid is allowed to enter the polymerisation zone of a gas phase polymerisation process the quantity of liquid in the polymerisation zone is small in relation to the quantity of polymer present. This is in contrast to "solution phase" processes wherein the polymer is formed dissolved in a solvent, and "slurry phase" processes wherein the polymer forms as a suspension in a liquid diluent.

The gas phase process can be operated under batch, semi-batch, or so-called "continuous" conditions. It is preferred to operate under conditions such that monomer is continuously recycled to an agitated polymerisation zone containing polymerisation catalyst, make-up monomer being provided to replace polymerised monomer, and continuously or intermittently withdrawing produced polymer from the polymerisation zone at a rate comparable to the rate of formation of the polymer, fresh catalyst being added to the polymerisation zone to replace the catalyst withdrawn form the polymerisation zone with the produced polymer.

For typical production of impact copolymers, homopolymer formed from the first monomer in a first reactor is reacted with the second monomer in a second reactor. For manufacture of propylene/ethylene impact copolymer in a gas-phase process, propylene is polymerized in a first reactor; reactive polymer transferred to a second reactor in which ethylene or other comonomer is added. The result is an intimate mixture of a isotactic polypropylene chains with chains of a random propylene/ethylene copolymer. A random copolymer typically is produced in a single reactor in which a minor amount of a comonomer (typically ethylene) is added to polymerizing chains of propylene.

Methods for operating gas phase fluidised bed processes for making polyethylene, ethylene copolymers and polypropylene are well known in the art. The process can be operated, for example, in a vertical cylindrical reactor equipped with a perforated distribution plate to support the bed and to distribute the incoming fluidising gas stream through the bed. The fluidising gas circulating through the bed serves to remove the heat of polymerisation from the bed and to supply monomer for polymerisation in the bed. Thus the fluidising gas generally comprises the monomer(s) normally together with some inert gas (e.g. nitrogen or inert hydrocarbons such as methane, ethane, propane, butane, pentane or hexane) and optionally with hydrogen as molecular weight modifier. The hot fluidising gas emerging from the top of the bed is led optionally through a velocity reduction zone (this can be a cylindrical portion of the reactor having a wider diameter) and, if desired, a cyclone and or filters to disentrain fine solid particles from the gas stream. The hot gas is then led to a heat exchanger to remove at least part of the heat of polymerisation. Catalyst is preferably fed continuously or at regular intervals to the bed. At start up of the process, the bed comprises fluidisable polymer which is preferably similar to the target polymer. Polymer is produced continuously within the bed by the polymerisation of the monomer(s). Preferably means are provided to discharge polymer from the bed continuously or at regular intervals to maintain the fluidised bed at the desired height. The process is generally operated at relatively low pressure, for example, at 10 to 50 bars, and at temperatures for example, between 50 and 120° C. The temperature of the bed is maintained below the sintering temperature of the fluidised polymer to avoid problems of agglomeration.

In the gas phase fluidised bed process for polymerisation of olefins the heat evolved by the exothermic polymerisation reaction is normally removed from the polymerisation zone (i.e. the fluidised bed) by means of the fluidising gas stream as described above. The hot reactor gas emerging from the top of the bed is led through one or more heat exchangers wherein the gas is cooled. The cooled reactor gas, together with any make-up gas, is then recycled to the base of the bed. In the gas phase fluidised bed polymerisation process of the present invention it is desirable to provide additional cooling of the bed (and thereby improve the space time yield of the process) by feeding a volatile liquid to the bed under conditions such that the liquid evaporates in the bed thereby absorbing additional heat of polymerisation from the bed by the "latent heat of evaporation" effect. When the hot recycle gas from the bed enters the heat exchanger, the volatile liquid can condense out. In one embodiment of the present invention the volatile liquid is separated from the recycle gas and reintroduced separately into the bed. Thus, for example, the volatile liquid can be separated and sprayed into the bed. In another embodiment of the present invention the volatile liquid is recycled to the bed with the recycle gas. Thus the volatile liquid can be condensed from the fluidising gas stream emerging from the reactor and can be recycled to the bed with recycle gas, or can be separated from the recycle gas and then returned to the bed.

The method of condensing liquid in the recycle gas stream and returning the mixture of gas and entrained liquid to the bed is described in EP-A-0089691 and EP-A-0241947. It is preferred to reintroduce the condensed liquid into the bed separate from the recycle gas using the process described in our U.S. Pat. No. 5541270, the teaching of which is hereby incorporated into this specification.

When using the catalysts of the present invention under gas phase polymerisation conditions, the catalyst, or one or more of the components employed to form the catalyst can, for example, be introduced into the polymerisation reaction zone in liquid form, for example, as a solution in an inert liquid diluent. Thus, for example, the transition metal component, or the activator component, or both of these components can be dissolved or slurried in a liquid diluent and fed to the polymerisation zone. Under these circumstances it is preferred the liquid containing the component(s) is sprayed as fine droplets into the polymerisation zone. The droplet diameter is preferably within the range 1 to 1000 microns. EP-A-0593083, the teaching of which is hereby incorporated into this specification, discloses a process for introducing a polymerisation catalyst into a gas phase polymerisation. The methods disclosed in EP-A-0593083 can be suitably employed in the polymerisation process of the present invention if desired.

Although not usually required, upon completion of polymerisation or copolymerisation, or when it is desired to terminate polymerisation or copolymerisation or at least temporarily deactivate the catalyst or catalyst component of this invention, the catalyst can be contacted with water, alcohols, acetone, or other suitable catalyst deactivators a manner known to persons of skill in the art.

Homopolymerisation of ethylene with the catalysts of the invention may produce so-called "high density" grades of polyethylene. These polymers have relatively high stiffness and are useful for making articles where inherent rigidity is required. Copolymerisation of ethylene with higher 1-olefins (e.g. butene, hexene or octene) can provide a wide variety of copolymers differing in density and in other important physical properties. Particularly important copolymers made by copolymerising ethylene with higher 1-olefins with the catalysts of the invention are the copolymers having a density in the range of 0.91 to 0.93. These copolymers which are generally referred to in the art as linear low density polyethylene, are in many respects similar to the so called low density polyethylene produced by the high pressure free radical catalysed polymerisation of ethylene. Such polymers and copolymers are used extensively in the manufacture of flexible blown film.

Propylene polymers produced by the process of the invention include propylene homopolymer and copolymers of propylene with less than 50 mole % ethylene or other alpha-olefin such as butene-1, pentene-1, 4-methylpentene-1, or hexene-1, or mixtures thereof. Propylene polymers also may include copolymers of propylene with minor amounts of a copolymerizable monomer. Typically, most useful are normally-solid polymers of propylene containing polypropylene crystallinity, random copolymers of propylene with up to about 10 wt. % ethylene, and impact copolymers containing up to about 20 wt. % ethylene or other alpha-olefin. Polypropylene homopolymers may contain a small amount (typically below 2 wt. %) of other monomers to the extent the properties of the homopolymer are not affected significantly.

Propylene polymers may be produced which are normally solid, predominantly isotactic, poly α-olefins. Levels of stereorandom by-products are sufficiently low so that useful products can be obtained without separation thereof. Typically, useful propylene homopolymers show polypropylene crystallinity and have isotactic indices above 90 and many times above 95. Copolymers typically will have lower isotactic indices, typically above 80–85.

Depending upon polymerisation conditions known in the art, propylene polymers with melt flow rates from below 1 to above 1000 may be produced in a reactor. For many applications, polypropylenes with a MFR from 2 to 100 are typical. Some uses such as for spunbonding may use a polymer with an MFR of 500 to 2000.

Depending upon the use of the polymer product, minor amounts of additives are typically incorporated into the polymer formulation such as acid scavengers, antioxidants, stabilizers, and the like. Generally, these additives are incorporated at levels of about 25 to 2000 ppm, typically from about 50 to about 1000 ppm, and more typically 400 to 1000 ppm, based on the polymer.

In use, polymers or copolymers made according to the invention in the form of a powder are conventionally compounded into pellets. Examples of uses for polymer compositions made according to the invention include use to form fibres, extruded films, tapes, spunbonded webs, moulded or thermoformed products, and the like. The polymers may be blown into films, or may be used for making a variety of moulded or extruded articles such as pipes, and containers such as bottles or drums. Specific additive packages for each application may be selected as known in the art. Examples of supplemental additives include slip agents, anti-blocks, anti-stats, mould release agents, primary and secondary anti-oxidants, clarifiers, nucleants, uv stabilizers, and the like. Classes of additives are well known in the art and include phosphite antioxidants, hydroxylamine (such as N,N-dialkyl hydroxylamine) and amine oxide (such as dialkyl methyl amine oxide) antioxidants, hindered amine light (uv) stabilizers, phenolic stabilizers, benzofuranone stabilizers, and the like. Various olefin polymer additives are described in U.S. Pat. Nos. 4,318,845, 4,325,863, 4,590,231, 4,668,721, 4,876,300, 5,175,312, 5,276,076, 5,326,802, 5,344,860, 5,596,033, and 5,625,090.

Fillers such as silica, glass fibers, talc, and the like, nucleating agents, and colourants also may be added to the polymer compositions as known by the art.

EXAMPLES

Example 1.1

Preparation of 2.6-diacetylpyridinebis(2,4,6 trimethyl anil).FeCl$_2$ Complex 4 g of 2,6-diacetylpyridine, 10.32 ml of 2,4,6-trimethylaniline and 0.2 g of p-toluenesulphonic acid monohydrate were added to 300 ml of dry toluene in a 500 ml, round bottomed flask. A 20 ml Dean-Stark heavy fractionating column and condenser were attached and the mixture heated with stirring to 160° C. The reaction appeared to have gone to completion in about 3 hours. The solution was then evacuated and 200 ml of methanol added. 2,6-diacetylpyridinebis(2,4,6 trimethyl anil) precipitated out and was isolated by filtration and washed with 3 aliquots of 20 ml of methanol. 3.19 g of iron (II) chloride was weighed into a half litre Schlenk tube and 400 ml of n-butanol added. The suspension was warmed to 90° C. and stirred for 3 hours. 10 g of 2,6-diacetylpyridinebis(2,4,6 trimethylanil) was added as a solid at 80° C. The reaction was stirred for 1 hour then at 25° C. over 3 days. The resultant blue suspension was allowed to settle and the supernatant liquid decanted off. Two washes of the precipitate with 200 ml aliquots of toluene were carried out, followed by one wash with 100 ml of n-pentane. The residual blue solid was pumped in vacuo for 6 hours until dry. It was stored and handled in a nitrogen atmosphere.

Example 1.2

Preparation of Silica-supported Catalyst

The calcinator used for calcining the silica support comprised a vertical quartz cylinder, 75 cm high and 5 cm in diameter, above which was placed a disengagement zone. The calcinator was equipped with a fluidisation grid made from porous quartz and positioned in the lower part of the quartz cylinder. It also had an electrical resistance heater and a supply of fluidising nitrogen.

Into the calcinator maintained at 60° C. and supplied with nitrogen containing less than 2 vpm of water vapour and with a flow rate of 4.7 ml/s, were charged 30 g of silica sold under the trade name of ES70X by Crosfield Catalysts (Warrington, England). The calcinator was then heated from 60 to 600° C. at a rate of 100° C./h, and the silica maintained at 600° C. for 16 hours in the fluidised state. The silica was then cooled to 25° C. and stored under dry nitrogen.

All subsequent operations were carried out in a nitrogen atmosphere. 12.5 g of the silica thus dried were suspended in a solution of 0.66 g of methylalumoxane (Witco, Bergkamen, Germany) in 11.1 g of toluene. The suspension was agitated for 2 hours at 25° C. The silica thus treated was washed five times with 20 ml of toluene and then dried under vacuum. 6.0 g of the treated silica was suspended in 20 ml of toluene and 0.184 g of the iron complex of Example 1.1 above in 10 ml of toluene was added. The suspension was agitated for 17 hours at 25° C. The catalyst thus prepared was washed five times with 20 ml of toluene and then dried under vacuum.

The supported catalyst contained 0.255% by weight of iron and 2.88% by weight of aluminium, corresponding to an atomic ratio Al/Fe of 23.4.

Example 1.3

Prepolymerisation: Slurry Phase Polymerisation of Ethylene

All operations were carried out in an atmosphere of nitrogen. A 2.5 litre stainless steel reactor fitted with a system of mechanical agitation was first heated by water in a heating jacket to 70° C. 1.2 litres of degassed Essence C (a C$_6$ alkane cut composed principally of hexane) was introduced into the reactor. Then 1.95 g of silica coated with triethylaluminium at a level of 1 mmole/g was added to the reactor as poison scavenger, and the reactor contents agitated at 300 rpm for several minutes. Next 5.5 g of the supported catalyst prepared in Example 1.2 above was introduced into the reactor. Again the reactor contents were agitated at 350 rpm for several minutes. Ethylene was then fed to the reactor at a constant rate of 3.3 g/minute over 18 minutes. After production of 59.4 g of polyethylene the reaction was stopped by cooling to 25° C., venting off the gases and purging with nitrogen. The Essence C was then removed from the polymer by filtration followed by evaporation under nitrogen. 59 g of prepolymer was thus recovered in the form of a dry, free-flowing powder, which was stored and handled under a nitrogen atmosphere.

Example 1.4

Gas Phase Polymerisation of Ethylene 400 g of polyethylene pellets were introduced into a stainless steel reactor of capacity 2.5 litres equipped with a stirrer and maintained under a nitrogen atmosphere. The reactor was heated to 100° C., stirred at 25 rpm and 0.7 g of silica previously treated with 1.5 mmole/g of triethylaluminium added as poison scavenger. Next 1.24 g of the prepolymer prepared in Example 1.3 above was added. Then hydrogen was introduced to pressure the reactor to 0.2 MPa, and finally ethylene fed until a total pressure of 0.8 MPa was obtained. Ethylene was fed to maintain this pressure throughout the reaction. After production corresponding to 50 g polyethylene per gram of catalyst, the stirring rate was increased to 100 rpm; after the production of 50 g of polyethylene the stirring rate was increased further to 150 rpm and then after the production of 100 g of polyethylene the stirring rate was increased further to 200 rpm.

Polymerisation was allowed to continue for 6 hours 47 minutes, during which period 248 g of polyethylene was produced. The reactor contents were cooled to 25° C. and were then recovered from the reactor. A sieve with 2 mm diameter mesh was used to separate the polyethylene pellets from the powder formed during the reaction. The recovered polymer powder had the following properties:

melt index (2.16 kg load)=1.76 melt index (5 kg load)=6.63 melt index (21.6 kg load)=113 density=963 kg/m$^3$ residual iron level=1.1 ppm

Example 2

Gas Phase Polymerisation of Ethylene

The iron complex, supported catalyst and the prepolymer were prepared exactly as described in Examples 1.1–1.3.

Then 400 g of polyethylene pellets were introduced into a stainless steel reactor of capacity 2.5 litres equipped with a stirrer and maintained under a nitrogen atmosphere. The reactor was heated to 100° C., stirred at 25 rpm and 0.7 g of silica previously treated with 1.5 mmole/g of triethylaluminium added as poison scavenger. 1.50 g of the prepolymer prepared as in Example 1.3 above was added. Then hydrogen was introduced to pressure the reactor to 0.1 MPa, and finally ethylene fed until a total pressure of 0.8 MPa was obtained. Ethylene was fed to maintain this pressure throughout the reaction. After production corresponding to 50 g polyethylene per gram of catalyst, the stirring rate was increased to 100 rpm; after the production of 50 g of polyethylene the stirring rate was increased further to 150 rpm, and after the production of 100 g of polyethylene the stirring rate was increased further, to 200 rpm.

Polymerisation was allowed to continue for 4 hours 52 minutes, during which period 300 g of polyethylene was produced. The reactor contents were cooled to 25° C. and recovered from the reactor. A sieve with 2 mm diameter mesh was used to separate the polyethylene pellets from the powder formed during the reaction. The recovered polymer powder had the following properties:

melt index (2.16 kg load)=0.49 melt index (5 kg load)=1.78 melt index (21.6 kg load)=28.7 density=963 kg/M$^3$ residual iron level=1.1 ppm

Example 3

Example 3.1—Preparation of Catalyst A 2,6-diacetylpyridinebis(2,4,6 trimethylanil)FeCl$_2$ (1.75 g, 0.00334mol) and Crosfield ES70X silica calcined at 500° C. (35 g) were both weighed into a large dry and deoxygenated Schlenk tube and suspended in toluene (200 cm$^3$). A 10% w/w solution of MAO in toluene (supplied by Albemarle) (28.13 cm$^3$, 2.94 g MAO, 0.05 mol) was added to the suspension turning it dark red/brown. The suspension was heated at 80° C. for one hour whilst being periodically agitated. The supernatant, which was now colourless, was decanted off and the slurry dried in vacuo to give a free flowing light red/brown solid.

Fe wt. %=0.47*

Al wt. %=3.40*

MAO wt. %=7.42*

Al/Fe ratio=15*

*estimated

Example 3.2

Preparation of Catalyst B

Crosfield ES70X silica calcined at 600° C. (60 g) was weighed into a large dry and deoxygenated Schlenk tube and suspended in toluene (400 cm$^3$). A 10% w/w solution of MAO in toluene (66.3 cm$^3$, 5.17 g MAO, 0.088 mol) was added to the suspension. The suspension was heated at 80° C. for one hour whilst being periodically agitated. 2,6-diacetylpyridinebis(2,4,6 trimethylanil).FeCl$_2$ (2.6 g, 0.00497 mol) was added to the suspension. The suspension was heated at 80° C. for one hour whilst being periodically agitated. The supernatant, which was now colourless, was decanted off and the slurry dried in vacuo to give a free flowing solid.

Fe wt. %=0.4*

Al wt. %=3.60*

MAO wt. %=7.9*

Al/Fe ratio=18*

*estimated

Example 3.3

Preparation of Catalyst C

Crosfield ES70X silica was precalcined at 200° C. in nitrogen for 6 hours in a fluidised bed. Under dry nitrogen, 250 g of the calcined silica was slurried in 900 ml dry toluene and 440 ml of 1.5 M MAO in toluene added. Reaction was allowed to proceed at ambient temperature for 30 minutes, after which the temperature was raised to 80° C. The temperature was maintained at 80–95° C. for 1 hour with occasional mixing. 2,6-diacetylpyridinebis(2,4,6 trimethylanil)FeCl$_2$ (3.48 g) was slurried in 50 ml toluene and added to the silica/MAO slurry at 80° C., with 20 ml toluene employed to assist the transfer. The mixture was heated at 80° C. for 1 hour with occasional mixing. The catalyst was then allowed to settle, decanted, and isolated by vacuum drying at 80° C. until a free flowing powder was recovered.

Analyses—0. 11% Fe/6.5% Al

Example 3.4

Prepolymerisation of Catalyst A

All operations were carried out in an atmosphere of nitrogen. A 5 litre stainless steel reactor fitted with a system of mechanical agitation was first heated by water in a heating jacket to 70° C. 2 litres of degassed Essence C (a C$_6$ alkane cut composed principally of hexane) was introduced into the reactor. Then 2.2 g of silica coated with triethylaluminium at a level of 1 mmole/g was added to the reactor as poison scavenger, and the reactor contents agitated at 300 rpm for several minutes. Next 20 g of catalyst A was introduced into the reactor. Again the reactor contents were agitated at 300 rpm for several minutes. Hydrogen was introduced in the reactor up to get an hydrogen partial pressure of 0.6 bar. Ethylene was then fed to the reactor at a constant rate of 1.2 g/minute over 3 h. After production of 300 g of polyethylene the reaction was stopped by cooling to 25° C., venting off the gases and purging with nitrogen. The Essence C was then removed from the polymer by filtration followed by evaporation under vacuum. 211 g of prepolymer was thus recovered in the form of a dry, free-flowing powder, which was stored and handled under a nitrogen atmosphere.

Example 3.5

Prepolymerisation of Catalyst B

The same procedure as in Example 3.4 above was followed, except that 30 g of catalyst B was employed using a partial pressure of hydrogen of 0.4 bar and an ethylene flowrate of 1.8 g/min for 3 hours. 305 g of prepolymer was obtained.

Example 3.6

Prepolymerisation of Catalyst C

The same procedure as in Example 3.4 above was followed, except that 30.8 g of catalyst C was employed using a partial pressure of hydrogen of 0.8 bar and an ethylene flowrate of 1.8 g/min for 3 hours. 284 g of prepolymer was obtained.

Example 3.7

Gas Phase Polymerisation of Ethylene

The prepolymer catalysts of Examples 3.4–3.6 were tested in continuous fluidised bed polymerisation using a gas phase reactor of diameter 15 cm. Catalyst was injected into the bed on a continuous basis, with the number of injections per hour being adjusted to suit the production rate around 1 kgPE/h. Polymer was removed from the bed on a continuous basis, with the number of withdrawals per hour being adjusted to maintain a constant bed height. The bed height was fixed at 70 cm and the fluidisation velocity was 26 cm/s.

Main operating conditions and product properties are given in Table 1 below.

TABLE 1

| Catalyst of Example- | 3.4 | 3.5 | 3.5 | 3.6 |
|---|---|---|---|---|
| Temperature (° C.) | 95 | 95 | 95 | 95 |
| pC$_2$ (bar) | 8 | 8 | 8 | 8 |
| Ratio pH$_2$/pC$_2$ | 0.20 | 0.24 | 0.23 | 0.31 |
| pC$_5$ (bar) | 2 | 2 | 2 | 2 |
| TEA mM Al/kgC$_2$ | 0.1 | 0 | 0.1 | 0.1 |
| Production rate gPE/h | 1 | 0.9 | 0.9 | 0.9 |
| Residence time h | 3.5 | 3.5 | 3.5 | 3.7 |
| PE yield - kgPE/gcat | 2.8 | 3.2 | 3.2 | 2.7 |
| Ave. activity PE/gcat.h.bC$_2$ | 100 | 115 | 111 | 91 |
| MI (g/10 min) | 0.7 | 0.7 | 0.8 | 0.6 |
| Density (g/cc) | 0.959 | 0.961 | 0.96 | 0.962 |
| Ave particle size (μm) | 946 | 798 | 796 | 586 |
| % < 125 μm | 0.8 | 1.5 | 1.5 | 1.0 |

TABLE 1-continued

| Catalyst of Example- | 3.4 | 3.5 | 3.5 | 3.6 |
|---|---|---|---|---|
| span | 1 | 1.2 | 1.1 | 1 |
| Bulk density (kg/dm$^3$) | 0.35 | 0.26 | 0.33 | 0.36 |

What is claimed is:

1. A process for the polymerization of 1-olefins, comprising the steps of a) preparing a prepolymer-based catalyst by contacting one or more 1-olefins with a catalyst system, and b) contacting the prepolymer-based catalyst with one or more 1-olefins, wherein the catalyst system comprises (1) a compound of the formula I

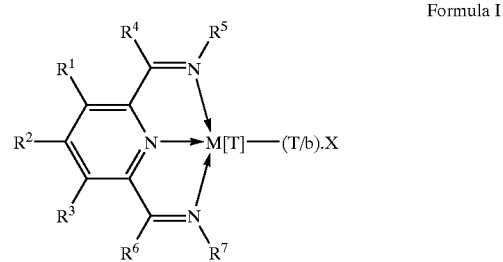

Formula I wherein M is Fe[II], Fe[III], Co[I], Co[II], Co[III], Mn[I], Mn[II], Mn[III], Mn[IV], Ru[II], Ru[III] or Ru [IV]; X represents an atom or group covalently or ionically bonded to the transition metal M; T is the oxidation state of the transition metal M and b is the valency of the atom or group X; $R^1$, $R^2$, $R^3$, $R^4$, $R^5$, $R^6$ and $R^7$ are independently selected from the group consisting of hydrogen, halogen, hydrocarbyl, substituted hydrocarbyl, heterohydrocarbyl and substituted heterohydrocarbyl; and when any two or more of $R^1$–$R^7$ are hydrocarbyl, substituted hydrocarbyl, heterohydrocarbyl or substituted heterohydrocarbyl, said two or more of $R^1$–$R^7$ can be linked to form one or more cyclic substituents; and optionally (2) an activator.

2. The process of claim 1, wherein the catalyst system additionally comprises (3) a compound of the formula AlR$_3$, wherein each R is independently C$_1$–C$_{12}$ alkyl or halo.

3. The process of claim 2, wherein the compound (3) is incorporated into the catalyst system during step a).

4. The process of claim 2, wherein the compound (3) is incorporated into the catalyst system during step b).

5. The process of claim 2 or 3, wherein the compound (3) is trimethyl aluminium, triethylaluminium or triisobutyl aluminium.

6. The process of claim 1, including the activator (2) which is incorporated into the catalyst system during step a).

7. The process of claim 1, including the activator (2) which is incorporated into the catalyst system during step b).

8. The process of claim 1, wherein the activator (2) is methylalumoxane.

9. The process of claim 1, wherein the compound (1) comprises the skeletal unit

Formula II

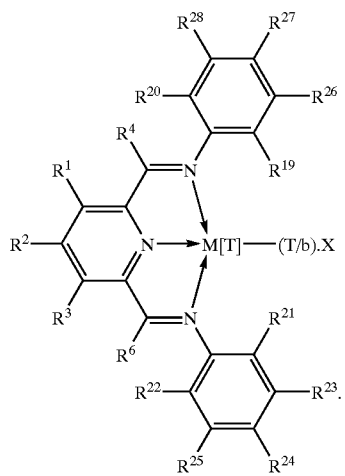

wherein M is Fe[II], Fe[III], Co[I], Co[II], Co[III], Mn[I], Mn[II], Mn[III], Mn[IV], Ru[II], Ru[III] or Ru[IV]; X represents an atom or group covalently or ionically bonded to the transition metal M; T is the oxidation state of the transition metal M and b is the valency of the atom or group X; $R^1$ to $R^4$, $R^6$ and $R^{19}$ to $R^{28}$ are independently selected from the group consisting of hydrogen, halogen, hydrocarbyl, substituted hydrocarbyl, heterohydrocarbyl or substituted heterohydrocarbyl; and when any two or more of $R^1$ to $R^4$, $R^6$ and $R^{19}$ to $R^{28}$ are hydrocarbyl, substituted hydrocarbyl, heterohydrocarbyl or substituted heterohydrocarbyl, said two or more of $R^1$ to $R^4$, $R^6$ and $R^{19}$ to $R^{28}$ can be linked to form one or more cyclic substituents; with the proviso that at least one of $R^{19}$, $R^{20}$, $R^{21}$ and $R^{22}$ is hydrocarbyl, substituted hydrocarbyl, heterohydrocarbyl or substituted heterohydrocarbyl when neither of the two outer ring systems forms part of a polyaromatic fused-ring system.

10. The process of claim 1, wherein X is selected from the group consisting of halide, sulphate, nitrate, thiolate, thiocarboxylate, $BF_4-$, $PF_6-$, hydride, hydrocarbyloxide, carboxylate, hydrocarbyl, substituted hydrocarbyl, heterohydrocarbyl, and β-diketonates.

11. The process of claim 1, wherein X is selected from the group consisting of chloride, bromide, methyl, ethyl, propyl, butyl, octyl, decyl, phenyl, benzyl, methoxide, ethoxide, isopropoxide, tosylate, triflate, formate, acetate, phenoxide and benzoate.

12. The process of claim 1, wherein the catalyst system further comprises a neutral Lewis base.

13. The process of claim 12, wherein the neutral Lewis base is selected from the group consisting of alkenes, other than 1-olefins, alkynes, primary amines, secondary amines, tertiary amines, amides, phosphoramides, phosphines, phosphites, ethers, thioethers, nitriles, esters, ketones, aldehydes, carbon monoxide, carbon dioxide, sulphoxides, sulphones and boroxines.

14. The process of claim 1, wherein the catalyst system is supported on a support material selected from the group consisting of silica, alumina, $MgCl_2$, zirconia, polyethylene, polypropylene, polystyrene, and poly(aminostyrene).

15. The process of claim 1, wherein the compound (1) is selected from the group consisting of one or more of
2,6-diacetylpyridinebis(2,6-diisopropylanil)$FeCl_2$
2,6-diacetylpyridine(2,6-diisopropylanil)$MnCl_2$
2,6-diacetylpyridine(2,6-diisopropylanil)$CoCl_2$
2,6-diacetylpyridinebis(2-tert.-butylanil)$FeCl_2$
2,6-diacetylpyridinebis(2,3-dimethylanil)$FeCl_2$
2,6-diacetylpyridinebis(2-methylanil)$FeCl_2$
2,6-diacetylpyridinebis(2,4-dimethylanil)$FeCl_2$
2,6-diacetylpyridinebis(2,6-dimethylanil)$FeCl_2$
2,6-diacetylpyridinebis(2,4,6 trimethylanil)$FeCl_2$
2,6-dialdiminepyridinebis(2,6-dimethylanil)$FeCl_2$
2,6-dialdiminepyridinebis(2,6-diethylanil)$FeCl_2$
2,6-dialdiminepyridinebis(2,6-diisopropylanil)$FeCl_2$
2,6-dialdiminepyridinebis(1-naphthil)$FeCl_2$ and
2,6-bis(1,1-diphenylhydrazone)pyridine $FeCl_2$.

16. The process of claim 1, wherein the polymerization is conducted in the presence of hydrogen as a molecular weight modifier.

17. The process of claim 1, wherein the polymerization conditions are solution phase, slurry phase or gas phase.

18. The process of claim 1, wherein the polymerization is conducted under gas phase fluidized bed conditions.

19. The process of claim 1, wherein the polymerization is conducted in slurry phase in an autoclave or continuous loop reactor.

20. The process of claim 1, wherein the polymerization is conducted in more than one reactor.

21. The process of claim 20, wherein the polymerization is conducted in two to five reactors in series.

* * * * *